United States Patent
Kim et al.

(10) Patent No.: US 10,020,920 B2
(45) Date of Patent: Jul. 10, 2018

(54) METHOD FOR TRANSMITTING ENHANCED REFERENCE SIGNAL IN MULTI-ANTENNA WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Jonghyun Park, Seoul (KR); Kijun Kim, Seoul (KR); Hanjun Park, Seoul (KR); Kunil Yum, Seoul (KR)

(73) Assignee: LG Electronics Inc., Seoul (KR)

(*) Notice: Subject to any disclaimer, the term of this patent is extended or adjusted under 35 U.S.C. 154(b) by 6 days.

(21) Appl. No.: 15/112,971

(22) PCT Filed: Mar. 4, 2015

(86) PCT No.: PCT/KR2015/002078
§ 371 (c)(1),
(2) Date: Jul. 20, 2016

(87) PCT Pub. No.: WO2015/133812
PCT Pub. Date: Sep. 11, 2015

(65) Prior Publication Data
US 2016/0344524 A1 Nov. 24, 2016

Related U.S. Application Data

(60) Provisional application No. 61/948,011, filed on Mar. 4, 2014.

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0413* (2013.01); *H04B 7/0617* (2013.01);
(Continued)

(58) Field of Classification Search
CPC ... H04L 5/0048; H04L 5/0023; H04L 5/0051; H04B 7/0691; H04B 7/0617;
(Continued)

(56) References Cited

U.S. PATENT DOCUMENTS

2010/0069122 A1* 3/2010 Ito .................... H04B 7/0684
455/562.1
2011/0205930 A1* 8/2011 Rahman ............... H04B 7/0417
370/252
(Continued)

FOREIGN PATENT DOCUMENTS

WO  WO 2014/003383 A1  1/2014
WO  WO 2014/010994 A1  1/2014

*Primary Examiner* — Faisal Choudhury
(74) *Attorney, Agent, or Firm* — Birch, Stewart, Kolasch & Birch, LLP

(57) ABSTRACT

The present invention relates to a method and apparatus for transmitting a reference signal by a base station in a wireless communication system supporting multiple antennas. More specifically, the present invention comprises the steps of: transmitting a reference signal configuration including specific reference signal IDs configured to identify a plurality of antenna groups; transmitting at least one reference signal associated with the plurality of antenna groups; and receiving channel state information measured according to the at least one reference signal, wherein each antenna group includes a plurality of antennas which are grouped on the basis of a specific domain of the multiple antennas, and the plurality of antenna groups are configured to perform beamforming in different directions.

7 Claims, 6 Drawing Sheets

(51) Int. Cl.
- *H04B 7/06* (2006.01)
- *H04B 7/0413* (2017.01)
- *H04W 72/04* (2009.01)
- *H04L 27/26* (2006.01)
- *H04W 88/08* (2009.01)

(52) U.S. Cl.
CPC ......... *H04B 7/0626* (2013.01); *H04B 7/0691* (2013.01); *H04L 27/2613* (2013.01); *H04W 72/046* (2013.01); *H04L 5/0023* (2013.01); *H04L 5/0051* (2013.01); *H04W 88/08* (2013.01)

(58) Field of Classification Search
CPC . H04B 7/0413; H04B 7/0626; H04W 72/046; H04W 88/08
USPC .......................................................... 370/329
See application file for complete search history.

(56) References Cited

U.S. PATENT DOCUMENTS

| | | |
|---|---|---|
| 2012/0176939 A1 | 7/2012 | Qu et al. |
| 2013/0005403 A1* | 1/2013 | Kuwahara ............ H04W 48/10 455/561 |
| 2013/0258964 A1 | 10/2013 | Nam et al. |
| 2013/0272151 A1 | 10/2013 | Thomas et al. |
| 2015/0124736 A1 | 5/2015 | Ko et al. |
| 2015/0141028 A1* | 5/2015 | Zhou .................... H04W 24/08 455/452.1 |
| 2015/0180628 A1 | 6/2015 | Kim et al. |
| 2016/0183289 A1* | 6/2016 | Qiang .............. H04W 72/1273 370/280 |
| 2016/0337881 A1* | 11/2016 | Zhang ................. H04B 7/0456 |

* cited by examiner (a)

(b)

(a)

(b)

METHOD FOR TRANSMITTING ENHANCED REFERENCE SIGNAL IN MULTI-ANTENNA WIRELESS COMMUNICATION SYSTEM AND APPARATUS THEREFOR

CROSS REFERENCE TO RELATED APPLICATIONS

This application is the National Phase of PCT/KR2015/002078 filed on Mar. 4, 2015, which claims priority under 35 U.S.C. § 119(e) to U.S. Provisional Application No. 61/948,011 filed on Mar. 4, 2014, all of which are hereby expressly incorporated by reference into the present application.

TECHNICAL FIELD

The present invention relates to a wireless communication system, and more particularly, to a method of transmitting an enhanced reference signal in a wireless communication system supporting multiple antennas and an apparatus therefor.

BACKGROUND ART

Multiple-Input Multiple-Output (MIMO) technology is a technology capable of improving data transmission/reception efficiency using multiple transmit (Tx) antennas and multiple receive (Rx) antennas instead of using a single Tx antenna and a single Rx antenna. In particular, a transmitting end or a receiving end of a wireless communication system can increase capability or improve performance using multiple antennas. Accordingly, the MIMO technology can also be referred to as a multi-antenna technology.

In order to support multi-antenna transmission, it may be able to apply a precoding matrix to appropriately distribute transmission information to each antenna according to a channel status and the like. A legacy 3GPP (3$^{rd}$ Generation Partnership Project) LTE (Long Term Evolution) system supports maximum 4 transmission antennas (4 Tx) to perform downlink transmission and defines a precoding codebook according to the transmission antennas.

In a multi-antenna system-based cellular communication environment, data transfer rate can be enhanced via beamforming between a transmitting end and a receiving end. Whether to apply a beamforming scheme is managed based on channel information. In general, it may be able to use a scheme that a receiving end appropriately quantizes a channel estimated by a reference signal and the like using a codebook and gives a transmitting end feedback on the quantized channel.

In the following, a spatial channel matrix (simply, channel matrix) capable of being used for generating a codebook is briefly explained. The spatial channel matrix (or, channel matrix) can be represented as follows.

$$H(i,k) = \begin{bmatrix} h_{1,1}(i,k) & h_{1,2}(i,k) & \cdots & h_{1,Nt}(i,k) \\ h_{2,1}(i,k) & h_{2,2}(i,k) & \cdots & h_{2,Nt}(i,k) \\ \vdots & \vdots & \ddots & \vdots \\ h_{Nr,1}(i,k) & h_{Nr,2}(i,k) & \cdots & h_{Nr,Nt}(i,k) \end{bmatrix}$$

In this case, H (i, k) corresponds to a spatial channel matrix, Nr corresponds to the number of reception antennas, Nt corresponds to the number of transmission antennas, r corresponds to an index of an reception antenna, t corresponds to an index of a transmission antenna, i corresponds to an index of an OFDM (or SC-FDMA) symbol, and k corresponds to an index of a subcarrier.

$h_{r,t}(i,k)$ corresponds to an element of a channel matrix H (i, k) indicating a state of an $r^{th}$ channel and a $t^{th}$ antenna on an $i^{th}$ symbol and $k^{th}$ subcarrier.

A spatial channel covariance matrix capable of being used in the present invention is briefly explained in the following. The spatial channel covariance matrix can be represented by such a sign as R. In particular, the spatial channel covariance matrix can be represented as $R=E[H_{i,k}{}^{H}H_{i,k}]$. In this case, H and R correspond to a spatial channel matrix and a spatial channel covariance matrix, respectively. E[ ] corresponds to a mean, i corresponds to a symbol index, and k corresponds to a frequency index.

SVD (singular value decomposition) is one of important methods for decomposing a rectangular matrix. The SCD is widely used in signal processing and statistics. The SVD generalizes a spectrum theory of a matrix in response to a random rectangular matrix. An orthogonal square matrix can be decomposed to a diagonal matrix using the spectrum theory based on an Eigen value. Assume that a channel matrix H corresponds to m×n matrix consisting of a set element of real numbers or complex numbers. In this case, the matrix H can be represented by multiplication of three matrixes described in the following.

$$H_{m \times n} = U_{m \times m} \Sigma_{m \times n} V_{n \times n}{}^{H}$$

In this case, U and V correspond to unitary matrixes and $\Sigma$ corresponds to m×n diagonal matrix including a singular value which is not a negative value. The singular value corresponds to $\Sigma = \text{diag}(\sigma_1 \ldots \sigma_r), \sigma_i = \sqrt{\lambda_i}$. As mentioned above, when a matrix is represented by multiplication of three matrixes, it is referred to as singular value decomposition. It may be able to handle a much more general matrix using the singular value decomposition compared to Eigen value decomposition capable of decomposing an orthogonal square matrix only. The singular value decomposition and the Eigen value decomposition are related to each other.

When a matrix H corresponds to an Hermite matrix which is positive definite, all Eigen values of the H correspond to real numbers which are not negative numbers. In this case, a singular value and a singular vector of the H correspond to real numbers which are not negative numbers. In particular, the singular value and the singular vector of the H become identical to the Eigen value and the Eigen vector of the H. Meanwhile, EVD (Eigen value Decomposition) can be represented as follows (in this case, Eigen value may correspond to $\lambda 1, \ldots, \lambda r$).

$$HH^H = (U\Sigma V^H)(U\Sigma V^H)^H = U\Sigma\Sigma^T U^H$$

$$H^H H = (U\Sigma V^H)^H (U\Sigma V^H) = V\Sigma^T \Sigma V$$

In this case, Eigen value may correspond to $\lambda 1, \ldots, \lambda r$. When singular value decomposition is performed on $HH^H$, it is able to know information on U among U and V that indicate channel direction. When singular value decomposition is performed on $H^H H$, it is able to know information on V. In general, each of a transmitting end and a receiving end performs beamforming to achieve a higher transfer rate in MU-MIMO (multi user-MIMO). If a beam of the receiving end and a beam of the transmitting end are represented by a matrix T and a matrix W, respectively, a channel to which beamforming is applied can be represented as $THW=TU(\Sigma)VW$. Hence, it may be preferable to generate a reception beam on the basis of the U and generate a transmission beam on the basis of the V to achieve a higher transfer rate.

In general, main concern in designing a codebook is to reduce feedback overhead using the number of bits as small as possible and precisely quantify a channel to achieve sufficient beamforming gain. One of schemes of designing a codebook, which is proposed or selected by recent communication standard such as 3GPP LTE (3rd Generation Partnership Project Long Term Evolution), LTE-Advanced, IEEE 16m system, etc. corresponding to an example of a mobile communication system, is to transform a codebook using a long-term covariance matrix of a channel as shown in equation 1 in the following.

$$W' = \text{norm}(RW) \quad \text{[Equation 1]}$$

In this case, W corresponds to a legacy codebook for reflecting short-term channel information, R corresponds to a long-term covariance matrix of a channel H, and norm (A) corresponds to a normalized matrix that norm is normalized by 1 according to each column of a matrix A. W' corresponds to a final codebook transformed from the legacy codebook W using the channel matrix H, the long-term covariance matrix R of the channel matrix H and a norm function.

The R, which is the long-term covariance matrix of the channel matrix H, can be represented as equation 2 in the following.

$$R = E[H^H H] = V\Lambda V^H = \sum_{i=1}^{Nt} \sigma_i v_i v_i^H \quad \text{[Equation 2]}$$

In this case, if the singular value decomposition is performed on the R, which is the long-term covariance matrix of the channel matrix H, the R is decomposed to $V\Lambda V^H$. V corresponds to Nt×Nt unitary matrix and has Vi as an $i^{th}$ column vector. $\Lambda$ corresponds to a diagonal matrix and has $\sigma_i$ as an $i^{th}$ diagonal component. $V^H$ corresponds to an Hermitian matrix of the V. And, $\sigma_i$, $v_i$ respectively correspond to an $i^{th}$ singular value and an $i^{th}$ singular column vector corresponding to the $i^{th}$ singular value ($\sigma_1 \geq \sigma_2 \geq \ldots \geq \sigma_{Nt}$).

DISCLOSURE OF THE INVENTION

Technical Task

A technical task of the present invention is to provide a method of transmitting an enhanced reference signal in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of transmitting a reference signal, which is transmitted by a base station in a wireless communication system supporting multiple antennas, include the steps of transmitting a reference signal configuration including a specific reference signal ID for identifying a plurality of antenna groups, transmitting at least one or more reference signals associated with a plurality of the antenna groups, and receiving channel state information measured according to the at least one or more reference signals. In this case, each of a plurality of the antenna groups includes a plurality of antennas which are configured on the basis of a specific domain of the multiple antennas and a plurality of the antenna groups are configured to perform beamforming in a different direction.

Preferably, the specific reference signal ID may correspond to a reference signal ID including a maximum value among reference signal IDs included in an initial ID for generating a scrambling sequence of the at least one or more reference signals.

Preferably, the specific reference signal ID may indicate an initial ID set for generating a scrambling sequence of the at least one or more reference signals.

Preferably, the at least one or more reference signals can be defined to be quasi co-located.

Preferably, the channel state information can be configured to report channel state information measured for all channels associated with the at least one or more reference signals.

Preferably, the channel state information may correspond to a maximum value among at least one or more RSRPs (reference signal received powers), which are measured according to the at least one or more reference signals, and the specific reference signal ID.

Preferably, the channel state information may correspond to a reference signal ID associated with a maximum value among at least one or more RSRPs (reference signal received powers), which are measured according to the at least one or more reference signals.

Preferably, the channel state information may correspond to RSRPs (reference signal received powers) as many as the number of parameters signaled by the base station and a reference signal ID associated with the RSRPs.

Preferably, the specific reference signal ID can be indicated via higher layer signaling.

To further achieve these and other advantages and in accordance with the purpose of the present invention, according to a different embodiment, a base station transmitting a reference signal in a wireless communication system supporting multiple antennas includes a radio frequency unit and a processor, the processor configured to transmit a reference signal configuration including a specific reference signal ID for identifying a plurality of antenna groups, the processor configured to transmit at least one or more reference signals associated with a plurality of the antenna groups, the processor configured to receive channel state information measured according to the at least one or more reference signals. In this case, each of a plurality of the antenna groups includes a plurality of antennas which are configured on the basis of a specific domain of the multiple antennas and a plurality of the antenna groups are configured to perform beamforming in a different direction.

Advantageous Effects

According to embodiments of the present invention, it is able to provide a method of transmitting an enhanced reference signal in a wireless communication system and an apparatus therefor.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Mode for Invention

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following detailed description is given under the assumption that 3GPP LTE mobile communication systems are used. However, the description may be applied to any other mobile communication system except for specific features inherent to the 3GPP LTE systems.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a terminal refers to a mobile or fixed type user equipment such as a user equipment (UE), and an advanced mobile station (AMS). Also, it is assumed that a base station refers to a random node of a network terminal, such as Node B, eNode B, and an access point (AP), which performs communication with the user equipment.

In a mobile communication system, a user equipment may receive information from a base station through a downlink and transmit information to the base station through an uplink. The information that the user equipment transmits or receives includes data and various types of control information. There are various physical channels according to the types and usages of information that the user equipment transmits or receives.

As an example of a mobile communication system to which the present invention is applicable, a 3rd Generation Partnership Project Long Term Evolution (hereinafter, referred to as LTE) communication system is described in brief.

Figure 1:
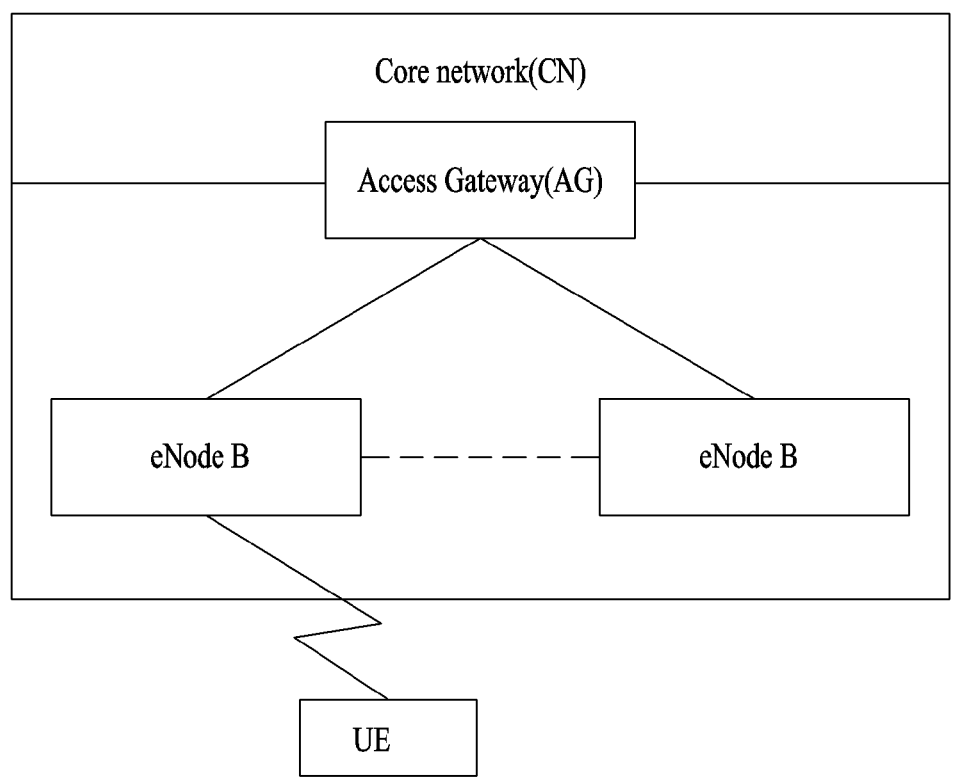
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system.

An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information.

In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

Recently, 3GPP has standardized technology subsequent to LTE. In this specification, the technology will be referred to as "LTE-Advanced" or "LTE-A". A main difference between the LTE system and the LTE-A system is a system bandwidth. The LTE-A system aims to support a wideband of up to 100 MHz. To achieve this, the LTE-A system employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in the LTE system. Each frequency block is transmitted using a component carrier.

Figure 2:
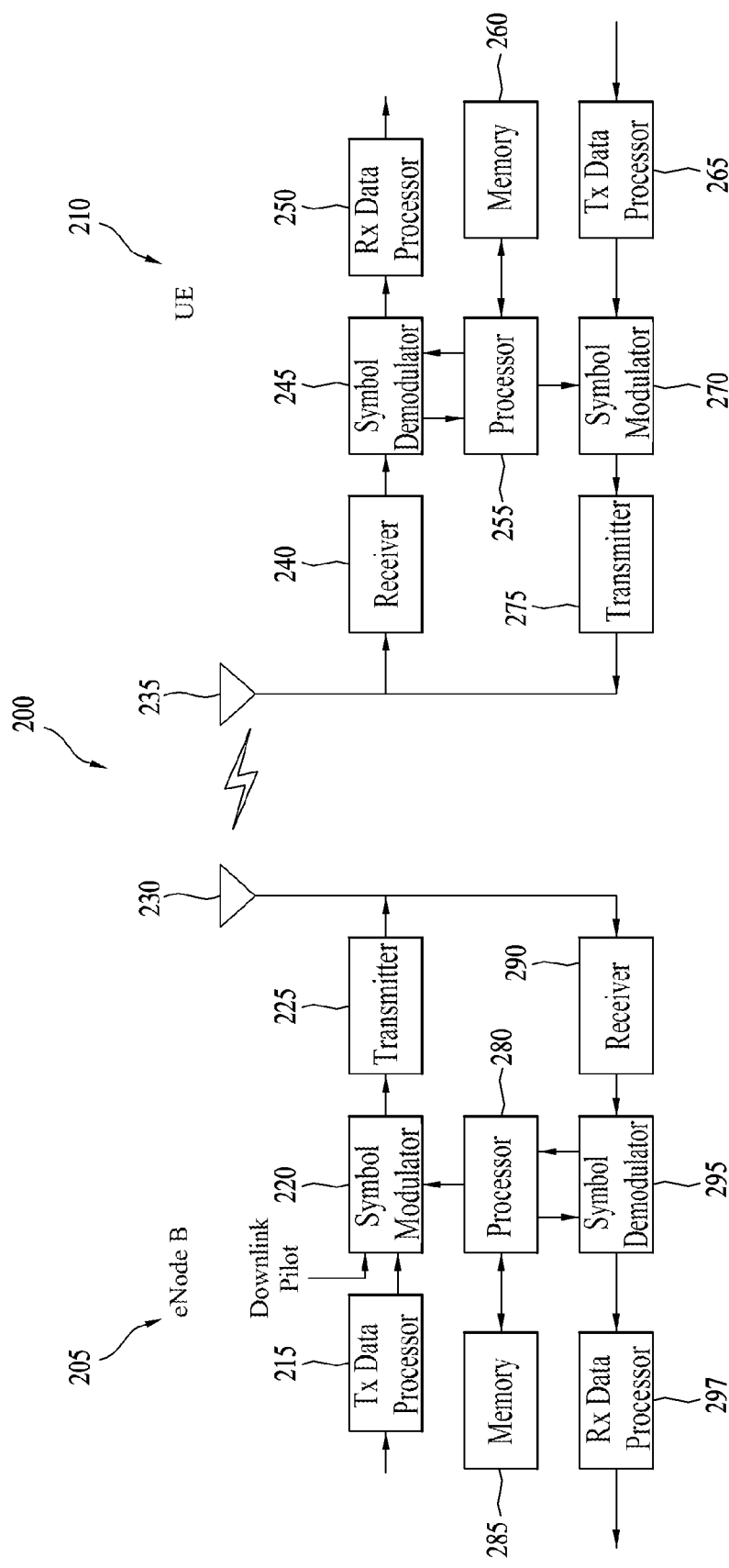
FIG. 2 is a block diagram illustrating configurations of a base station 205 and a user equipment 210 in a wireless communication system 200 according to the present invention.

FIG. 2 is a block diagram illustrating configurations of a base station 205 and a user equipment 210 in a wireless communication system 200.

Although one base station 205 and one user equipment 210 are shown for simplification of a wireless communication system 200, the wireless communication system 200 may include one or more base stations and/or one or more user equipments.

Referring to FIG. 2, the base station 105 may include a transmitting (Tx) data processor 215, a symbol modulator 220, a transmitter 225, a transmitting and receiving antenna 230, a processor 280, a memory 285, a receiver 290, a symbol demodulator 295, and a receiving (Rx) data processor 297. The user equipment 210 may include a Tx data processor 265, a symbol modulator 270, a transmitter 275, a transmitting and receiving antenna 235, a processor 255, a memory 260, a receiver 240, a symbol demodulator 255, and an Rx data processor 250. Although the antennas 230 and 235 are respectively shown in the base station 205 and the user equipment 210, each of the base station 205 and the user equipment 210 includes a plurality of antennas. Accordingly, the base station 205 and the user equipment 210 according to the present invention support a multiple input multiple output (MIMO) system. Also, the base station 205 according to the present invention may support both a single user-MIMO (SU-MIMO) system and a multi user-MIMO (MU-MIMO) system.

On a downlink, the Tx data processor 215 receives traffic data, formats and codes the received traffic data, interleaves and modulates (or symbol maps) the coded traffic data, and provides the modulated symbols ("data symbols"). The symbol modulator 220 receives and processes the data symbols and pilot symbols and provides streams of the symbols.

The symbol modulator 220 multiplexes the data and pilot symbols and transmits the multiplexed data and pilot symbols to the transmitter 225. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 receives the streams of the symbols and converts the received streams into one or more analog symbols. Also, the transmitter 225 generates downlink signals suitable for transmission through a radio channel by additionally controlling (for example, amplifying, filtering and frequency upconverting) the analog signals. Subsequently, the downlink signals are transmitted to the user equipment through the antenna 230.

In the user equipment 210, the antenna 235 receives the downlink signals from the base station 205 and provides the received signals to the receiver 240. The receiver 240 controls (for example, filters, amplifies and frequency downcoverts) the received signals and digitalizes the controlled signals to acquire samples. The symbol demodulator 245 demodulates the received pilot symbols and provides the demodulated pilot symbols to the processor 255 to perform channel estimation.

Also, the symbol demodulator 245 receives a frequency response estimation value for the downlink from the processor 255, acquires data symbol estimation values (estimation values of the transmitted data symbols) by performing data demodulation for the received data symbols, and provides the data symbol estimation values to the Rx data processor 250. The Rx data processor 250 demodulates (i.e., symbol de-mapping), deinterleaves, and decodes the data symbol estimation values to recover the transmitted traffic data.

Processing based on the symbol demodulator 245 and the Rx data processor 250 is complementary to processing based on the symbol demodulator 220 and the Tx data processor 215 at the base station 205.

On an uplink, the Tx data processor 265 of the user equipment 210 processes traffic data and provides data symbols. The symbol modulator 270 receives the data symbols, multiplexes the received data symbols with the pilot symbols, performs modulation for the multiplexed symbols, and provides the streams of the symbols to the transmitter 275. The transmitter 275 receives and processes the streams of the symbols and generates uplink signals. The uplink signals are transmitted to the base station 205 through the antenna 235.

The uplink signals are received in the base station 205 from the user equipment 210 through the antenna 230, and the receiver 290 processes the received uplink signals to acquire samples. Subsequently, the symbol demodulator 295 processes the samples and provides data symbol estimation values and the pilot symbols received for the uplink. The Rx data processor 297 recovers the traffic data transmitted from the user equipment 210 by processing the data symbol estimation values.

The processors 255 and 280 of the user equipment 210 and the base station 205 respectively command (for example, control, adjust, manage, etc.) the operation at the user equipment 210 and the base station 205. The processors 255 and 280 may respectively be connected with the memories 260 and 285 that store program codes and data. The memories 260 and 285 respectively connected to the processor 280 store operating system, application, and general files therein.

Each of the processors 255 and 280 may be referred to as a controller, a microcontroller, a microprocessor, and a microcomputer. Meanwhile, the processors 255 and 280 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 255 and 280. Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 255 and 280, or may be stored in the memories 260 and 285 and driven by the processors 255 and 280.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

The term, base station used in the present invention may refer to a "cell or sector" when used as a regional concept. A serving base station (or serving cell) may be regarded as a base station which provides main services to UEs and may transmit and receive control information on a coordinated multiple transmission point. In this sense, the serving base station (or serving cell) may be referred to as an anchor base station (or anchor cell). Likewise, a neighboring base station may be referred to as a neighbor cell used as a local concept.

Multiple Antenna System

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

Figure 3:
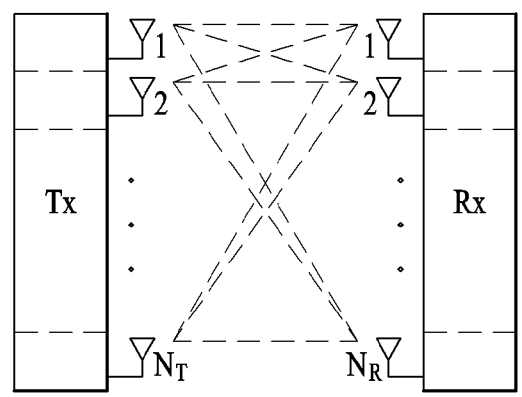
FIG. 3 is a diagram for a configuration of a general MIMO communication system.
Figure 3:
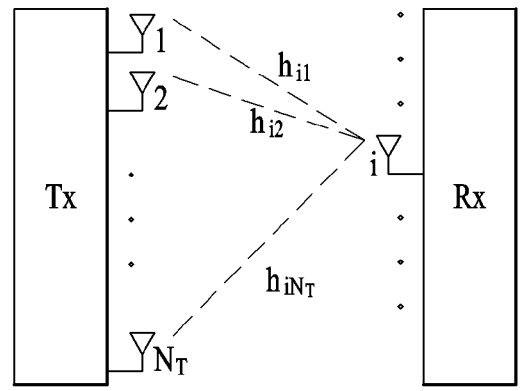

FIG. 3(a) shows the configuration of a wireless communication system including multiple antennas. As shown in FIG. 3(a), the number of transmit (Tx) antennas and the number of Rx antennas respectively to $N_T$ and $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri). The rate of increase (Ri) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 7, it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}] \quad \text{[Equation 2]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

In Equation 3, $\hat{s}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{s}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{12} & \ldots & w_{2N_T} \\ \vdots & & \ddots & \vdots \\ w_{i2} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Given $N_R$ Rx antennas, signals received at the respective Rx antennas, $y_1, y_2, \ldots, y_{N_T}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. Examples of vector expressions are given as below. FIG. 3(b) illustrates channels from $N_T$ Tx antennas to an $i^{th}$ Rx antenna.

As illustrated in FIG. 3(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$. In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \le \min(N_T, N_R) \quad \text{[Equation 11]}$$

As a multi-antenna transmission and reception scheme used for operating a multi-antenna system, it may be able to use FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like can be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between transmission antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP can be classified into an MCW (multi codeword) S-VAP for mixing multiple codewords between antennas in spatial diversity or spatial multiplexing and an SCW (single codeword) S-VAP for using a single codeword.

Among the aforementioned MIMO transmission schemes, the STBC scheme corresponds to a scheme of obtaining time diversity in a manner that an identical data symbol is repeated in a time domain to support orthogonality. Similarly, the SFBC scheme corresponds to a scheme of obtaining frequency diversity in a manner that an identical data symbol is repeated in a frequency domain to support orthogonality. Examples of a time block code used for the STBC and a frequency block code used for the SFBC can be represented as equation 12 and equation 13, respectively. The equation 12 indicates a block code in case of 2 transmission antennas and the equation 13 indicates a block code in case of 4 transmission antennas.

$$\frac{1}{\sqrt{2}} \begin{pmatrix} S_1 & S_2 \\ -S_2^* & S_1^* \end{pmatrix} \quad \text{[Equation 12]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 13]}$$

In the equations 12 and 13, Si (i=1, 2, 3, 4) corresponds to a modulated data symbol. And, in the equations 12 and 13, a row of a matrix corresponds to an antenna port and a column of the matrix corresponds to time (STBC) or frequency (SFBC).

Figure 4:
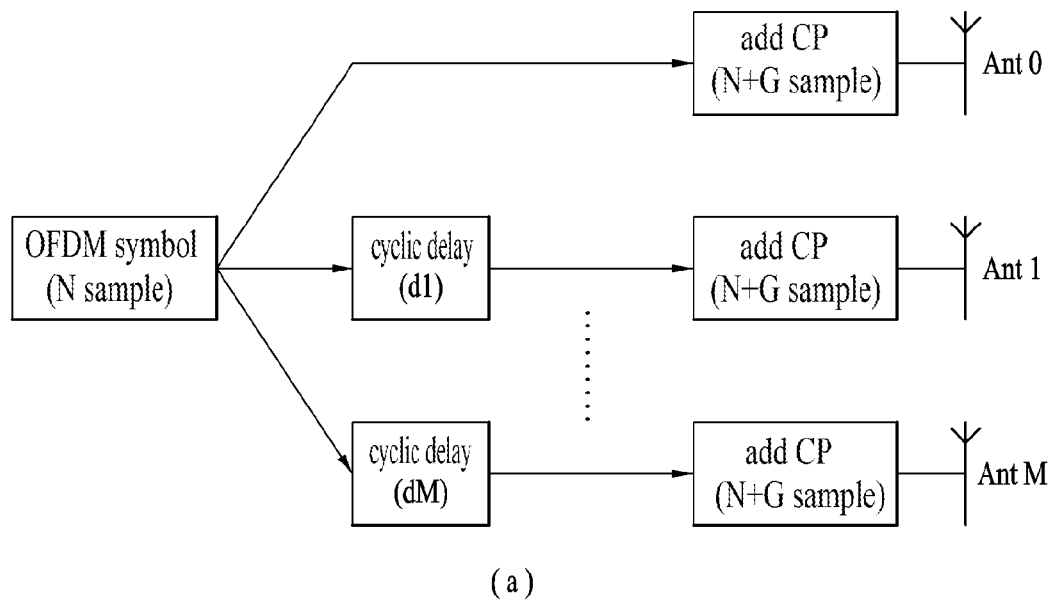
FIG. 4 is a diagram for an example of a general CDD structure in a MIMO system.
Figure 4:
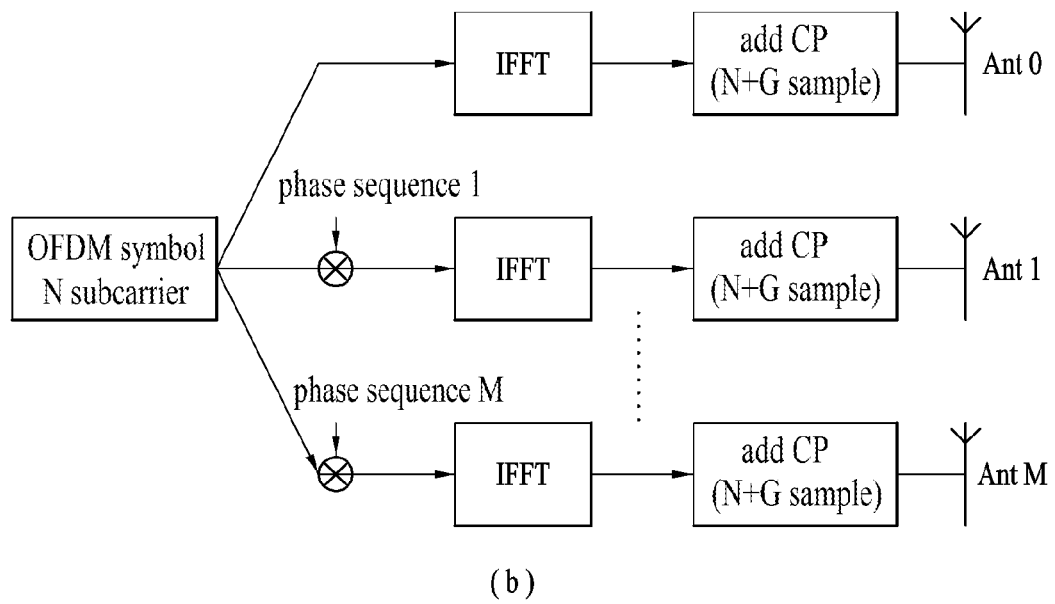

Meanwhile, among the aforementioned MIMO transmission schemes, the CDD scheme corresponds to a scheme of increasing frequency diversity by increasing delay propagation on purpose. FIG. 4 shows an example of a general CDD structure in a multi-antenna system. FIG. 4 (a) shows a scheme of applying cyclic delay in time domain. As shown in FIG. 4 (b), the CDD scheme applying the cyclic delay of FIG. 4 (a) can also be implemented by applying phase-shift diversity.

Codebook-Based Precoding Scheme

In order to support MIMO antenna transmission, it may be able to apply precoding configured to appropriately distribute transmission information to each of multiple antennas according to a channel status and the like. A codebook-based precoding scheme corresponds to a scheme that a transmitting end and a receiving end determine a set of precoding matrixes in advance, the receiving end measures channel information from the transmitting end and gives feedback on a most suitable precoding matrix (i.e., precoding matrix index (PMI) to the transmitting end, and the transmitting end applies appropriate precoding to signal transmission based on the PMI.

Since the codebook-based precoding scheme is a scheme of selecting an appropriate precoding matrix from the predetermined set of precoding matrixes, although an optimized precoding is not always applied, feedback overhead can be reduced compared to a case of explicitly giving feedback on optimized precoding information to actual channel information.

Figure 5:
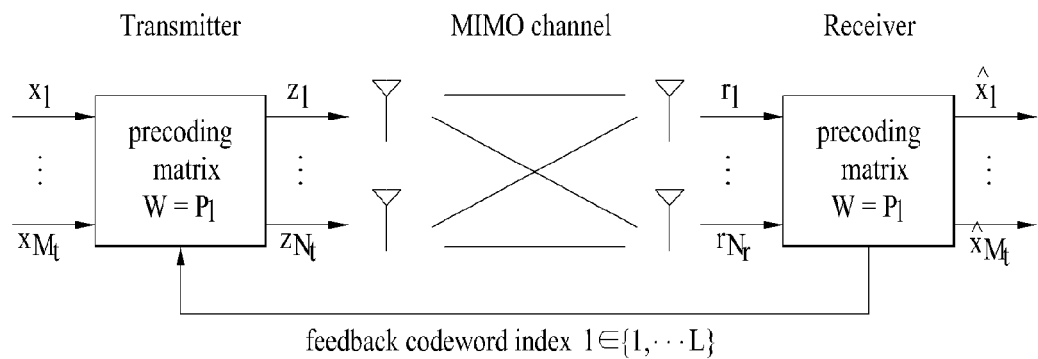
FIG. 5 is a diagram for explaining a basic concept of a codebook-based precoding.

FIG. 5 is a diagram for explaining a basic concept of a codebook-based precoding.

In case of following a codebook-based precoding scheme, a transmitting end and a receiving end share codebook information including the prescribed number of precoding matrixes, which are predetermined according to a transmission rank, the number of antennas, and the like. In particular, when feedback information is finite, the codebook-based precoding scheme can be used. The receiving end measures a channel state via a reception signal and may be then able to give feedback on information on the finite number of preferred precoding matrixes (i.e., an index of a corresponding precoding matrix) to the transmitting end based on the aforementioned codebook information. For instance, the receiving end measures a reception signal using ML (maximum likelihood) or MMSE (minimum mean square error) scheme and may be then able to select an optimized precoding matrix. Although FIG. 5 shows a case that the receiving end transmits precoding matrix information to the transmitting end according to a codeword, by which the present invention may be non-limited.

Having received the feedback information from the receiving end, the transmitting end can select a specific precoding matrix from a codebook based on the received information. The transmitting end, which has selected the precoding matrix, performs precoding in a manner of multiplying the number of layer signals corresponding to a transmission rank by the selected precoding matrix and may be then able to transmit a transmission signal on which the precoding is performed via a plurality of antennas. In a precoding matrix, the number of rows is identical to the number of antennas and the number of columns is identical to a rank value. Since the rank value is identical to the number of layers, the number of columns is identical to the number of layers. For instance, if the number of transmission antennas corresponds to 4 and the number of transmission layers corresponds to 2, a precoding matrix can be configured by a 4×2 matrix. Information transmitted via each layer can be mapped to each antenna through the precoding matrix.

Having received a signal, which is transmitted from the transmitting end in a manner of being pre-coded, the receiving end can restore the received signal in a manner of performing reverse processing on the precoding processed in the transmitting end. In general, since a precoding matrix satisfies a unitary matrix (U) condition such as $U*U^H=1$, the reverse processing performed on the precoding can be performed using a scheme of multiplying Hermite matrix ($P^H$) of a precoding matrix (P) used in the precoding of the transmitting end by the received signal.

For instance, Table 1 in the following shows a codebook used for downlink transmission using 2 transmission antennas in 3GPP LTE release-8/9 and Table 2 in the following shows a codebook used for downlink transmission using 4 transmission antennas in 3GPP LTE release-8/9.

TABLE 4

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n^{\{s\}}$ can be obtained by a set $\{s\}$ configured from an equation represented as $W_n = I - 2u_n u_n^H / u_n^H u_n$. In this case, I indicates a 4×4 single matrix and $u_n$ is a value given in Table 2.

As shown in Table 1, in case of a codebook for 2 transmission antennas, it may have total 7 precoding vectors/matrixes. In this case, since a single matrix is used for an open-loop system, total 6 precoding vectors/matrixes are used for a close-loop system. And, in case of a codebook for 4 transmission antennas shown in Table 2, it may have total 64 precoding vectors/matrixes.

The aforementioned codebook has a common property such as a CM (constant modulus) property, a nested property, a constrained alphabet property, and the like. The CM property corresponds to a property that each element of all precoding matrixes in a codebook does not include '0' and has a same size. The nested property corresponds to a property that a precoding matrix of a lower rank is configured by a subset of a specific column of a precoding matrix of a higher rank. The constrained alphabet property corresponds to a property that an alphabet of each element of all precoding matrixes in a codebook is configured by $$\left\{ \pm 1, \pm j, \pm \frac{(1+j)}{\sqrt{2}}, \pm \frac{(-1+j)}{\sqrt{2}} \right\}.$$

In Table 2, $W_n^{\{s\}}$ can be obtained from a set $\{s\}$ configured by an equation represented as $W_n = I - 2u_n u_n^H / u_n^H u_n$. In this case, I corresponds to 4×4 single matrix and $u_n$ corresponds to a value given by Table 2.

As shown in Table 1, a codebook for two transmission antennas includes 7 precoding vectors/matrixes in total. In this case, since a single matrix is used for an open-loop system, for precoding of a closed-loop system, there are 6 precoding vectors/matrixes in total. And, as shown in Table 2, a codebook for 4 transmission antennas has 64 precoding vectors/matrixes in total.

The aforementioned codebook has a common property such as a CM (constant modulus) property, a nested property, a constrained alphabet property, and the like. The CM property corresponds to a property that each element of all precoding matrixes in a codebook does not include '0' and has a same size. The nested property corresponds to a property that a precoding matrix of a lower rank is configured by a subset of a specific column of a precoding matrix of a higher rank. The constrained alphabet property corresponds to a property that an alphabet of each element of all precoding matrixes in a codebook is configured by $$\left\{ \pm 1, \pm j, \pm \frac{(1+j)}{\sqrt{2}}, \pm \frac{(-1+j)}{\sqrt{2}} \right\}.$$

Feedback Channel Structure

Basically, since a base station is unable to know information on a downlink channel in FDD (frequency division duplex) system, the base station uses channel information fed back by a UE for downlink transmission. In case of a legacy 3GPP LTE release-8/9 system, a UE can feedback downlink channel information via PUCCH or PUSCH. In case of the PUCCH, the PUCCH periodically feedbacks channel information. In case of the PUSCH, the PUSCH aperiodically feedbacks channel information according to a request of the base station. And, channel information can be fed back in response to the whole of assigned frequency bands (i.e., wideband (WB)) or the specific number of RBs (i.e., subband (SB)).

Extended Antenna Configuration

Figure 6:
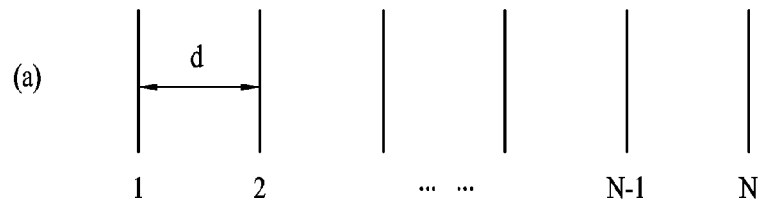
FIG. 6 is a diagram for examples of configuring 8 transmission antennas.
Figure 6:
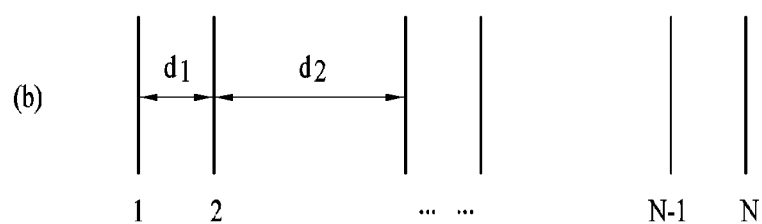
Figure 6:
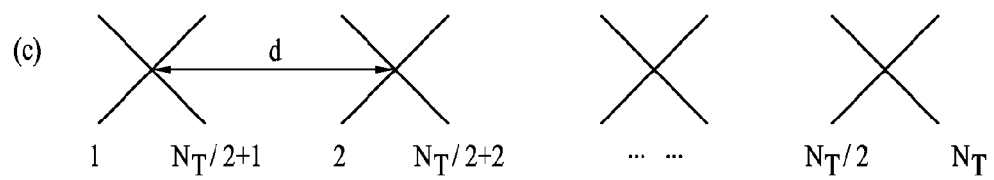

FIG. 6 is a diagram for examples of configuring 8 transmission antennas.

FIG. 6 (a) shows a case that N numbers of antennas configure an independent channel without grouping. In general, this case is referred to as an ULA (uniform linear array). If a plurality of antennas are deployed in a manner of being apart from each other, a space of a transmitter and/or a receiver may not be sufficient enough for configuring channels independent from each other.

FIG. 6 (b) shows an antenna configuration (paired ULA) of a ULA scheme that two antennas make a pair. In this case, an associated channel may exist between the two antennas making a pair and an independent channel may exist with an antenna of a different pair.

Meanwhile, unlike a legacy 3GPP LTE release-8/9 using 4 transmission antennas in downlink, 3GPP LTE release-10 system may use 8 transmission antennas in downlink. In order to apply the extended antennas configuration, it is necessary to install many antennas in an insufficient space. Hence, the ULA antenna configurations shown in FIG. 6 (a) and (b) may not be appropriate for the extended configuration. Hence, as shown in FIG. 6 (c), it may consider applying a dual-pole (or cross-pole) antenna configuration. If transmission antennas are configured using the dual-pole (or cross-pole) antenna configuration, although a distance d between antennas is relatively short, it is able to transmit data of high throughput by lowering antenna correlation.

Codebook Structures

As mentioned in the foregoing description, if a predefined codebook is shared between a transmitting end and receiving end, it is able to reduce overhead of the receiving end resulted from making a feedback on precoding information to be used for MIMO transmission of the transmitting end. Hence, it is able to apply efficient precoding.

As an example of configuring a predetermined codebook, it may be able to configure a precoder matrix using a DFT (Discrete Fourier Transform) matrix or a Walsh matrix. Or, it may be able to configure a precoder of various forms in a manner of combining with a phase shift matrix or a phase shift diversity matrix.

In case of a co-polarization antenna system, a codebook of a DFT system shows good performance. In this case, when the DFT matrix-based codebook is configured, n×n DFT matrix can be defined as equation 14 in the following.

$$DFTn: D_n(k, \ell) = \frac{1}{\sqrt{n}} \exp(-j2\pi k\ell/n), \qquad \text{[Equation 14]}$$

$$k, \ell = 0, 1, \ldots, n-1$$

The DFT matrix shown in the equation 14 exists as a single matrix in response to a specific size n. Hence, in order to define various precoding matrixes and appropriately use the various precoding matrixes according to a situation, it may consider additionally configuring and using a rotated version of a DFTn matrix. Equation 15 in the following shows an example of a rotated DFTn matrix.

$$\text{rotated } DFTn: \qquad \text{[Equation 15]}$$

$$D_n^{(G,g)}(k, \ell) = \frac{1}{\sqrt{n}} \exp(-j2\pi k(\ell + g/G)/n),$$

$$k, \ell = 0, 1, \ldots, n-1,$$

$$g = 0, 1, \ldots, G.$$

If a DFT matrix is configured using the equation 15, it may be able to generate G number of rotated DFTn matrixes and the generated matrixes satisfy a property of a DFT matrix.

In the following, a householder-based codebook structure is explained. The householder-based codebook structure corresponds to a codebook configured by a householder matrix. The householder matrix is a matrix used for householder transform. The householder transform is a sort of linear transformations and can be used for performing QR decomposition. The QR decomposition is to decompose a matrix into an orthogonal matrix (Q) and an upper triangular matrix (R). The upper triangular matrix corresponds to a square matrix that all components below a main diagonal line component are 0. An example of 4×4 householder matrix is shown in equation 16 in the following.

$$M_1 = I_4 - 2u_0 u_1^H / \|u_0\|^2 \quad \text{[Equation 16]}$$

$$= \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$u_0^T = [1 \quad -1 \quad -1 \quad -1]$$

It may be able to generate 4×4 unitary matrix including a CM property by the householder transform. Similar to a codebook for 4 transmission antennas shown in Table 2, n×n precoding matrix can be generated using the householder transform and it may be able to configure the precoding matrix to be used for rank transmission less than n using a column subset of the generated precoding matrix.

Codebook for 8 Transmission Antennas

In 3GPP LTE release-10 system including an extended antenna configuration (e.g., 8 transmission antennas), it may be able to apply a feedback scheme previously used in a legacy 3GPP LTE release-8/9 system in a manner of extending the feedback scheme. For example, it may be able to feedback such channel state information (CSI) as an RI (rank indicator), a PMI (precoding matrix index), CQI (channel quality information) and the like. In the following, a method of designing a dual precoder-based feedback codebook capable of being used in a system supporting an extended antenna configuration is explained. In order to indicate a precoder to be used for MIMO transmission of a transmitting end in the dual precoder-based feedback codebook, a receiving end can transmit a precoding matrix index to the transmitting end. A precoding matrix can be indicated by a combination of two PMIs different from each other. In particular, if the receiving end feedbacks the two PMIs different from each other (i.e., a first PMI and a second PMI) to the transmitting end, the transmitting end determines a precoding matrix indicated by the first and the second PMI and may be then able to apply the determined precoding matrix to MIMO transmission.

In designing the dual precoder-based feedback codebook, it may consider MIMO transmission transmitted by 8 transmission antennas, whether or not single user-MIMO (SU-MIMO) and multiple user-MIMO (MU-MIMO) are supported, suitability of various antenna configurations, a reference of codebook design, a size of a codebook, and the like.

When a codebook is applied to MIMO transmission transmitted by 8 transmission antennas, if the codebook is greater than rank 2, SU-MIMO is supported only. If the codebook is equal to or less than the rank 2, it may consider designing a feedback codebook optimized to both the SU-MIMO and the MU-MIMO and the feedback codebook appropriate for various antenna configurations.

Regarding the MU-MIMO, it may be preferable to make UEs participating in the MU-MIMO to be separated from each other in a correlation domain. Hence, it is necessary to design a codebook for the MU-MIMO to be properly operated on a channel of high correlation. Since DFT vectors provide good performance on the channel of high correlation, it may consider including a DFT vector in a set of codebooks up to rank-2. And, in high scattering propagation environment (e.g., indoor environment including many reflected waves) capable of generating many spatial channels, a SU-MIMO operation may be more suitable as a MIMO transmission scheme. Hence, it may be able to configure a codebook for a rank greater than rank-2 to have good performance of identifying multiple layers.

When a precoder for MIMO transmission is designed, it may be preferable to make a precoder structure have good performance in response to various antenna configurations (low correlation, high correlation, cross-polarization, and the like). In case of arranging 8 transmission antennas, it may be able to configure a cross-polarization array including 4 λantenna space as a low-correlation antenna configuration, a ULA including 0.5 λantenna space as a high-correlation antenna configuration, or a cross-polarization array including 0.5 λantenna space as a cross-polarization antenna configuration. A DFT-based codebook structure can provide good performance in response to the high-correlation antenna configuration.

Meanwhile, block diagonal matrixes may be more suitable for the cross-polarization antenna configuration. Hence, if a diagonal matrix is introduced to a codebook for 8 transmission antennas, it is able to configure a codebook capable of providing goof performance to all antenna configurations.

As mentioned in the foregoing description, a reference of codebook design is to satisfy a unitary codebook, a CM property, a constrained alphabet property, an appropriate codebook size, a nested property and the like. The reference is applied to 3GPP LTE release-8/9 codebook design. It may consider applying the reference of codebook design to 3GPP LTE release-10 codebook design supporting an extended antenna configuration as well.

In relation to a size of a codebook, in order to sufficiently support a merit of using 8 transmission antennas, it is necessary to increase the size of the codebook. In order to obtain a sufficient precoding gain from the 8 transmission antennas in low correlation environment, a codebook (e.g., a codebook of a size greater than 4 bits in response to a rank 1 and a rank 2) of a big size may be required. A codebook of a size of 4 bits may be sufficient in obtaining a precoding gain in high correlation environment. Yet, in order to achieve a multiplexing gain of the MU-MIMO, it may be able to increase a codebook size for the rank 1 and the rank 2.

Based on the aforementioned contents, the present invention proposes a scheme of generating a precoding matrix capable of being operated by reducing a feedback amount and a new feedback structure to perform efficient transmission in a wireless communication system. In particular, the present invention is effective when a transmitter uses a massive antenna utilizing an active antenna system (hereinafter, AAS). As a representative embodiment, the present invention can be utilized for downlink communication between a base station and a user equipment in a cellular network.

Based on the aforementioned contents, the present invention explains a method of reducing overhead of a reference signal (RS) as a technology based on a 3D MIMO system in which a 2 dimensional active antenna system (2D-AAS) is installed.

In a wireless communication system appearing after LTE Rel-12, discussion on whether to introduce an antenna system utilizing an AAS is in progress. Since each antenna of the AAS is configured by an active antenna including an active circuit, it is able to reduce interference or support efficient performance of beamforming by adaptively changing an antenna pattern to wireless communication environment.

If the AAS is constructed in 2 dimension (2D-AAS), since it is able to control a beam direction not only to a legacy horizontal surface but also to a vertical surface using a main lobe of an antenna in terms of an antenna pattern, it may be able to more efficiently perform beam adaptation in 3 dimensional manner. Hence, it may be able to more actively change a transmission beam according to a location of a UE based on the more efficient beam adaptation.

Figure 7:
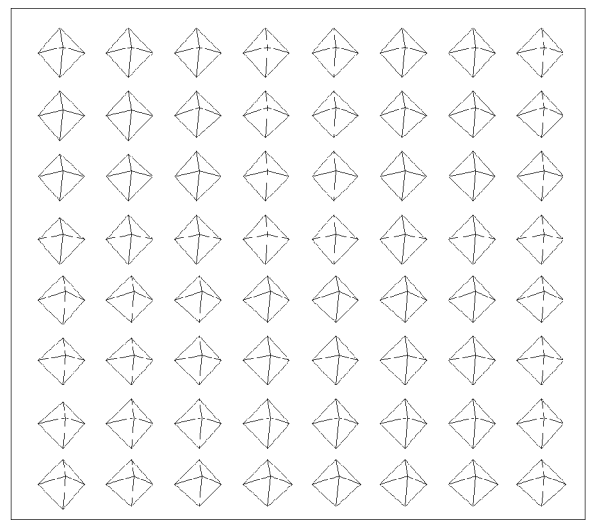
FIG. 7 is a diagram for an active antenna system (AAS)

FIG. 7 is a diagram for explaining a 2D-AAS to which the present invention is applicable. Since a plurality of antennas are installed in vertical direction and horizontal direction in the 2D-AAS shown in FIG. 7, it may be able to construct a plurality of antenna systems.

In particular, when the 2D-AAS shown in FIG. 7 is introduced, if a base station transmits reference signals of all antenna elements, reference signal overhead may considerably increase. For example, as shown in FIG. 7, if there are 64 antennas, the base station should transmit 64 reference signals (RSs) using 64 resource elements (REs). In order to prevent the overhead, it may be able to estimate precoding for a part of the 64 antennas via an SRS and may be then able to indicate CSI-RSs, which are less than 64, to which the estimated precoding is applied to a UE. Yet, in this case, since it is necessary to individually transmit a CSI-RS to which a different precoding is applied according to a UE, it is difficult to efficiently reduce the overhead.

Hence, several CSI-RS ports to which precoding are applied can form a group and the group can identically indicate a direction. A method of transmitting grouped CSI-RSs is proposed to indicate a plurality of directions using a plurality of the groups.

Figure 8:
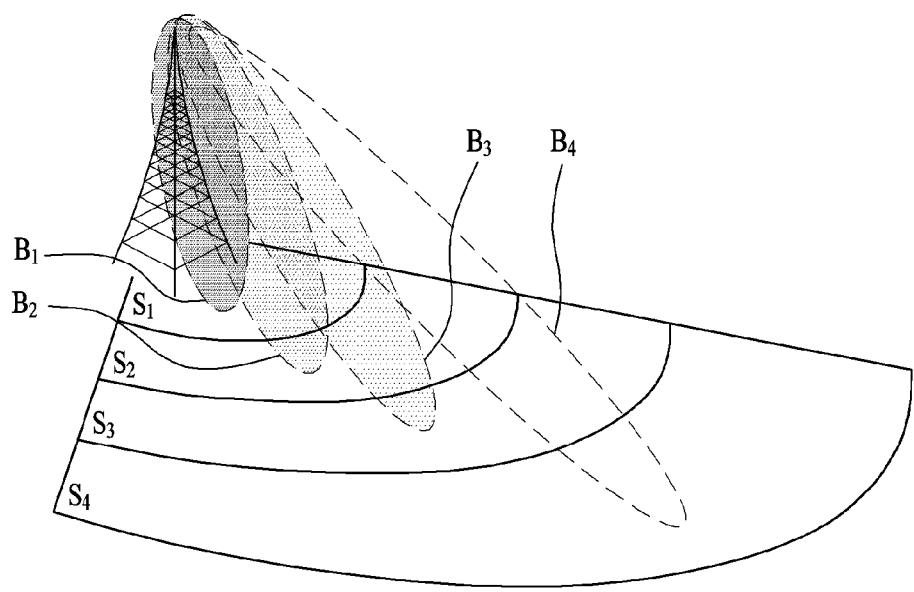
FIG. 8 is a diagram for explaining a case of performing beamforming in a different orthogonal direction according to the present invention.

FIG. 8 is a diagram for explaining a method of transmitting grouped CSI-RSs. In FIG. 8, assume that a base station has 64 antennas mentioned earlier in FIG. 7. $B_1$ corresponds to a form forming 8 ports and transmitting a reference signal (RS) from the 8 ports in a manner of applying an identical precoding to each column to make a beam to be formed in $B_1$ direction from 8 vertical antennas located at each column in an antenna array. 8 port reference signal indicating $B_2$, $B_3$, and $B_4$ direction is respectively transmitted to $B_2$, $B_3$ and $B_4$ beam with an identical scheme.

Hence, if a scheme described in FIG. 8 is applied, a base station can reduce transmission overhead by transmitting 32 reference signals (RSs) instead of 64 reference signals (RSs). In this case, if it is assumed as the reference signals (RSs) are transmitted as shown in FIG. 8, since $B_1$, $B_2$, $B_3$ and $B_4$ are respectively heading toward a different direction, a part of the $B_1$, the $B_2$, the $B_3$ and the $B_4$ can be transmitted using an identical resource. For example, since a beam direction is apart from each other between the $B_1$ and the $B_4$, if the $B_1$ and the $B_4$ are transmitted using an identical resource and the $B_2$ and the $B_3$ are transmitted via a different resource, overhead of total resources for transmitting a reference signal (RS) can be reduced to 24 REs from 32 REs. This is because, since vertical spread is relatively smaller than horizontal spread in terms of a vertical beam, although the $B_1$ and the $B_4$ are transmitted by an identical resource, an impact of interference is not that big.

Hence, in order to reduce resource overhead, if reference signals (RSs) are transmitted in a manner of dividing a beam direction into a plurality of beam directions, reference signals heading toward a different beam direction can be transmitted in a manner of being overlapped with each other by resource information identical to each other. Under this assumption, since the reference signals, which are transmitted in a manner of being overlapped with each other, have a different beam direction, less interference can be received. However, there is a problem in that interference still exists.

Hence, in order to solve the aforementioned problem regarding the interference, the present invention proposes a method of differently configuring an initial ID for a scrambling sequence of a reference signal according to a beam direction.

As a factor for differently configuring the initial ID for the scrambling sequence of the reference signal according to a beam direction, it may be able to add $N_{ID}^{ECSI}$ at the time of generating the initial ID. In the following, for clarity, the $N_{ID}^{ECSI}$ is referred to as an ERS ID (enhanced reference signal ID). The ERS ID can be configured by a base station via higher layer signaling.

Moreover, when the ERS ID ($N_{ID}^{ECSI}$) is added to an initial ID for a scrambling sequence of a CSI-RS, it can be defined as equation 17 in the following.

$$c_{init}=2^A \cdot N_{ID}^{ECSI}+2^{10} \cdot (7 \cdot (n_s+1)+l+1) \cdot (2 \cdot N_{ID}^{CSI}+1)+ 2 \cdot N_{ID}^{CSI}+N_{CP}$$ [Equation 17]

In the equation 17, $2^{10} \cdot (7 \cdot (n_s+1)+l+1) \cdot (2 \cdot N_{ID}^{CSI}+1)+2 \cdot N_{ID}^{CSI}+N_{CP}$ part is an equation defined to generate a scrambling sequence ID of a CSI-RS in 3GPP TS 36.211 which is a standard document related to legacy LTE/LTE-A. Based on this, the present invention proposes to add and apply the $N_{ID}^{ECSI}$ to a legacy CSI-RS as shown in the equation 17. In the equation 17, $2^A$ corresponds to a factor for making ID values not to be overlapped with each other. For example, if an ERS ID is added to an initial ID for a scrambling sequence of a CSI-RS only in a legacy LTE system, a value of A can be set to 28.

In the following description, a CSI-RS configuration related to the present invention is explained. In 3GPP TS 36.331 corresponding to a standard document of a legacy LTE wireless communication system (i.e., LTE release 11 and earlier), a non-zero power CSI-RS configuration is defined as shown in Table 3 in the following.

TABLE 3

```
-- ASN1START
CSI-RS-ConfigNZP-r11 ::=        SEQUENCE {
    csi-RS-ConfigNZPId-r11          CSI-RS-ConfigNZPId-r11,
    antennaPortsCount-r11           ENUMERATED {an1, an2, an4, an8},
    resourcesConfig-r11             INTEGER (0..31),
    subframeConfig-r11              INTEGER (0..154),
```

TABLE 3-continued

```
scramblingIdentity-r11          INTEGER (0..503),
qcl-CRS-Info-r11                SEQUENCE {
    qcl-SramblingIdentity-r11       INTEGER (0..503),
    crs-PortsCount-r11              ENUMERATED {n1, n2, n4, spare1{,
    mbsfn-SubrameConfigList-r11     CHOICE {
        release                         NULL,
        setup                           SEQUENCE {
            subframeConfigList              MBSFN-SubframeConfigList
        }
    }                                                   OPTIONAL   -- Need ON
}                                                   OPTIONAL,  -- Need OR
    ...
}
-- ASN1STOP
```

Table 3 is defined for a CSI-RS configuration on a legacy 3GPP standard document. The number of antennas, a CSI-RS ID number, resource configuration information, quasi co-located information and the like are included in the Table 3.

Hence, when $N_{ID}^{ECSI}$ is added at the time of generating an initial ID for a scrambling sequence of a reference signal (RS) proposed by the present invention, information on the $N_{ID}^{ECSI}$ and a configuration on the reference signal can be transmitted together. It may consider two methods described in the following.

A method of transmitting a maximum value $\max_{transmitting\ RS}(N_{ID}^{ECSI})$ in an RS-configuration among $N_{ID}^{ECSI}$ corresponding to an ERS ID of all reference signals transmitted in a single RS-configuration (hereinafter, first method)

A method of transmitting $N_{ID}^{ECSI}$ corresponding to an ERS ID of a single reference signal transmitted from a single RS-configuration in an RS-configuration (hereinafter, second method)

First of all, the first method is explained. It is able to know that reference signals as many as $\max_{transmitting\ RS}(N_{ID}^{ECSI})+1$ are currently transmitted in a manner that the $N_{ID}^{ECSI}$ is considered as a maximum value $\max_{transmitting\ RS}(N_{ID}^{ECSI})$ among $N_{ID}^{ECSI}$ corresponding to an ERS ID of a reference signal transmitted with a single RS-configuration. And, $N_{ID}^{ECSI}$ value, which is included in an initial ID for a reference signal scrambling sequence, may indicate 0, 1, . . . , $\max_{transmitting\ RS}(N_{ID}^{ECSI})$, respectively.

Although the $\max_{transmitting\ RS}(N_{ID}^{ECSI})$ is represented as the maximum value, a UE can consider the $\max_{transmitting\ RS}(N_{ID}^{ECSI})$ as a representative value and the UE can determine a set of $N_{ID}^{ECSI}$ values applied to an initial ID for a reference signal scrambling.

For example, if a value of the $\max_{transmitting\ RS}(N_{ID}^{ECSI})$ corresponds to '0', a set of the $N_{ID}^{ECSI}$ values may indicate {0, 2, 4, 6}. If the value of the $\max_{transmitting\ RS}(N_{ID}^{ECSI})$ corresponds to '1', a set of the $N_{ID}^{ECSI}$ values may indicate {1, 3, 5, 7}. In this case, if the value of the $\max_{transmitting\ RS}(N_{ID}^{ECSI})$ indicates '0', it indicates that there are 4 applied reference signals and each of the reference signals uses 0, 2, 4 and 6 for a reference signal scrambling initial ID. Moreover, definition on a configuration/value of the set of the $N_{ID}^{ECSI}$ values can be configured in advance between a base station and a UE or can be semi-statically changed via higher layer signaling (e.g., RRC signaling).

And, it may be able to indicate that identical information is applied to all RSs for the rest of signaling (e.g., resource information or quasi co-located information according to a current CSI-RS configuration information) except signaling of $N_{ID}^{ECSI}$ in an RS-configuration.

For example, it may be able to define/configure quasi co-location to be assumed between reference signals proposed by the present invention. In this case, assume that Doppler spread and Doppler shift corresponding to large scale parameters of a radio channel are shared between reference signals.

And, it may be able to define/configure all of the reference signals proposed by the present invention to be quasi co-located with a different reference signal (e.g., CRS) (e.g., qcl-CRS-Info-r11 defined in a CSI-RS configuration in a legacy LTE spec).

If the first method is applied to a CSI-RS configuration in a legacy LTE, CSI-RSs in the CSI-RS configuration assume quasi co-location with each other. In this case, it can be assumed that all of the CSI-RSs share quasi co-location information with a CRS transmitted from qcl-CSR-Info-r11. In this case, it indicates that the quasi co-location information shared between the CSI-RSs and the CRS can share Doppler spread and Doppler shift as well.

As a more specific example, in terms of PDSCH, when the quasi co-location information is obtained via CSI-RS configuration information, it may be able to transmit the CSI-RS configuration information in a manner of adding a value of $N_{ID}^{ECSI}$ to the CSI-RS configuration information. In this case, a UE can determine that ports of a designated CSI-RS and ports of the PDSCH are quasi co-located in terms of large scale parameters of a radio channel including Delay spread, Doppler spread, Doppler shift, and Average delay. In terms of the PDSCH, when quasi co-location information is obtained via the CSI-RS configuration information, if the CSI-RS configuration information is transmitted only without a value of $N_{ID}^{ECSI}$, the UE may determine that ports of a CSI-RS and ports of the PDSCH, which are included in a designated CSI-RS configuration, are all quasi co-located in terms of Delay spread and Doppler spread of a radio channel.

As a different example, assume that $\max_{transmitting\ RS}(N_{ID}^{ECSI})=2$, resource configuration=3, and quasi co-located CRS information 'B' are transmitted by an RS-configuration. In this case, a UE is able to know that 3 reference signals are transmitted. If each of the reference signals uses $N_{ID}^{ECSI}$ of 0, 1, or 2 (if $\max_{transmitting\ RS}(N_{ID}^{ECSI})$ is configured as a representative value, a set value of the $N_{ID}^{ECSI}$ is used). A UE can determine that the 3 reference signals are transmitted to an identical resource position (resource configuration=3) and the 3 reference signals are quasi co-located with each other in terms of Doppler spread and Doppler shift corresponding to large scale parameters of a radio channel. And, the UE can determine that the 3 reference signals are quasi co-located with each other in terms of a CRS specified in quasi co location information 'B', Doppler spread and Doppler shift.

Hence, in case of the method 1, information shared by many reference signals is transmitted at a time without separately transmitting the information to reduce signaling overhead. In particular, according to the first method, when reference signals including many beam directions are configured in such a system equipped with a plurality of antennas as 3D MIMO, since there is a possibility of using an identical resource by a plurality of reference signals in consideration of separation according to a beam direction and each of the reference signals performs transmission at a same location using an identical antenna, it is highly probable that quasi co-located information is to be shared by the reference signals, thereby increasing versatility.

In the following, a different embodiment of the first method proposed by the present invention is explained. Assume that a $UE_1$ is located between $S_1$ and $S_2$, a $UE_2$ is located between $S_2$ and $S_3$ and a $UE_3$ is located between $S_3$ and $S_4$ in FIG. 8. Assume that a base station transmits $B_1$, $B_2$, $B_3$, and $B_4$ to an identical resource via a single 8-port CSI-RS and uses a value of $N_{ID}^{ECSI}$ for $B_1$, $B_2$, $B_3$ and $B_4$ by '0', '1', '0', and '1', respectively.

If $max_{transmitting\ RS}(N_{ID}^{ECSI})=1$ is transmitted to a CSI-RS configuration under the aforementioned assumption, since the $UE_1$ is located between the $S_1$ and the $S_2$, the beam $B_1$ and the beam $B_2$ are dominant. Although the beam $B_1$ and the beam $B_2$ use an identical resource, since the $N_{ID}^{ECSI}$ value '0' and '1' are used for the beam $B_1$ and the beam $B_2$, respectively, such an effect as interference reduction can be generated in terms of interference. Similarly, the $UE_2$ and the $UE_3$ can also anticipate a channel for 2 beams using an identical scheme. Hence, in order show 4 beams to 3 UEs, the CSI-RS configuration can be used one time and a resource for a CSI-RS may use one 8-port CSI-RS.

If the second method is applied to a UE, it indicates that one reference signal using $N_{ID}^{ECSI}$ as an ERS ID is transmitted to a single RS-configuration value. The $N_{ID}^{ECSI}$ corresponds to an ERS ID of an initial ID for a reference signal scrambling sequence.

Hence, if a meaning of the $N_{ID}^{ECSI}$ is semi-statically changed while the first method and the second method are used together, it is able to indicate whether it is the first method or the second method using a $max_{transmitting\ RS}(N_{ID}^{ECSI})$ value or a $N_{ID}^{ECSI}$ value in RS-configuration. Or, signaling for selecting the first method or the second method can be transmitted in a manner of being included in a parameter explicitly specified in the RS-configuration.

More specifically, a method of including a $max_{transmitting\ RS}(N_{ID}^{ECSI})$ value in the RS-configuration according to the present invention such as the first method can be defined based on a non-zero power CSI-RS configuration of 3GPP TS36.331 release 11 of a legacy LTE standard. The definition is shown in Table 4 in the following.

TABLE 4

```
-- ASN1START
CSI-RS-ConfigNZP-r1x ::=       SEQUENCE {
    csi-RS-ConfigNZPId-r11         CSI-RS-ConfigNZPId-r11,
    antennaPortsCount-r11          ENUMERATED {an1, an2, an4, an8},
    resourceConfig-r11             INTEGER (0..31),
    subframeConfig-r11             INTEGER (0..154),
    scramblingIdentity-r11         INTEGER (0..503),
    qcl-CRS-Info-r11               SEQUENCE {
        qcl-ScramblingIdentity-r11     INTEGER (0..503),
        crs-PortsCount-r11             ENUMERATED {n1, n2, n4, spare1},
        mbsfn-SubframeConfigList-r11   CHOICE {
            release                        NULL,
            setup                          SEQUENCE {
                subframeConfigList             MBSFN-SubframeConfigList
            }
        }                                                  OPTIONAL  -- Need ON
    }                                                  OPTIONAL, -- Need OR
    maxEnhanceScramblingIdentity-r1x   INTEGER (0..maxmaxERSId)
    ...
}
-- ASN1STOP
```

In Table 4, a value of maxmaxERSId corresponds to a maximum value capable of being included in total ERSid. It may be able to use a $max_{transmitting\ RS}(N_{ID}^{ECSI})$ value equal to or less than the maximum value. In this case, the $max_{transmitting\ RS}(N_{ID}^{ECSI})$ value corresponds to a maximum value of $N_{ID}^{ECSI}$ in a currently transmitted reference signal. If the $max_{transmitting\ RS}(N_{ID}^{ECSI})$ value is configured as a representative value, as mentioned earlier in the RS-configuration embodiment, values of maxEnhanceScramblingIdentity-r1x can be configured by values indicating a set of $N_{ID}^{ECSI}$.

A method of including a $N_{ID}^{ECSI}$ value in the RS-configuration such as the second method can be defined based on a non-zero power CSI-RS configuration of 3GPP TS36.331 release 11 of a legacy LTE standard. The definition is shown in Table 5 in the following.

TABLE 5

```
-- ASN1START
CSI-RS-ConfigNZP-r1x ::=       SEQUENCE {
    csi-RS-ConfigNZPId-r11         CSI-RS-ConfigNZPId-r11,
    antennaPortsCount-r11          ENUMERATED {an1, an2, an4, an8},
    resourceConfig-r11             INTEGER (0..31),
```

TABLE 5-continued

```
subframeConfig-r11              INTEGER (0..154),
scramblingIdentity-r11          INTEGER (0..503),
qcl-CRS-Info-r11                SEQUENCE {
    qcl-ScramblingIdentity-r11      INTEGER (0..503),
    crs-PortsCount-r11              ENUMERATED {n1, n2, n4, spare1},
    mbsfn-SubframeConfigList-r11    CHOICE {
        release                         NULL,
        setup                           SEQUENCE {
            subframeConfigList              MBSFN-SubframeConfigList
        }
    }                                                   OPTIONAL  -- Need ON
}                                                       OPTIONAL,  -- Need OR
enhanceScramblingIdentity-r1x   INTEGER (0..maxERSId)
...
}
-- ASN1STOP
```

In Table 5, a value of maxmaxERSId corresponds to a maximum value capable of being included in total ERSid.

In the following, a CSI process configuration related to the present invention is explained. In 3GPP TS 36.331 corresponding to a standard document of a legacy LTE wireless communication system (i.e., LTE release 11 or earlier), a CSI process configuration is defined as Table 6 in the following.

TABLE 6

```
-- ASN1START
CSI-Process-r11 ::=         SEQUENCE {
    csi-ProcessId-r11           CSI-ProcessId-r11,
    csi-RS-ConfigNZPId-r11      CSI-RS-ConfigNZPId-r11,
    csi-IM-ConfigId-r11         CSI-IM-ConfigId-r11,
    p-C-AndCBSRList-r11         SEQUENCE (SIZE (1..2)) OP P-C-AndCBSR-r11,
    cqi-ReportBothProc-r11      CQI-ReportBothProc-r11          OPTIONAL,   -- Need OR
    cqi-ReportPeriodicProcId-r11            INTEGER (0..maxCQI-ProcExt-r11) OPTIONAL,   -- Need OR
    cqi-ReportAperiodicProc-r11 CQI-ReportAperiodicProc-r11     OPTIONAL,   -- Need OR
    ...
}
P-C-AndCBSR-r11 ::= SEQUENCE {
    p-C-r11                     INTEGER (-8..15),
    codebookSubsetRestriction-r11           BIT STRING
}
-- ASN1STOP
```

According to a definition on a CSI process configuration shown in Table 6, non-zero power CSI-RS information, interference measurement information, CQI report information, and the like are included in the CSI process configuration.

If the second method proposed in the present invention is used for the CSI-RS configuration, the definition shown in Table 6 of the legacy LTE system can be used. In this case, in case of the second method, CSI-RS-ConfigNZPId-r11 indicated by each NZP CSI-RS configuration can be configured in a manner of being extended to 1, 2, . . . , ($\max_{transmitting\ RS}(N_{ID}^{ECSI})$+1)*maxCSI-RS-NZP-r11 (maxCSI-RS-NZP-r11=3 in legacy LTE release-11).

Yet, similar to a legacy LTE release-11, when a range in which the CSI-RS-ConfigNZPId-r11 is configured is restricted to 1, 2, and maxCSI-RS-NZP-r11=3, if the first method proposed by the present invention is applied to the CSI-RS configuration, an ambiguity problem occurs in relation to a CSI-RS specified to a UE.

If $\max_{transmitting\ RS}(N_{ID}^{ECSI})$ is transmitted from the CSI-RS configuration, the UE receives $\max_{transmitting\ RS}(N_{ID}^{ECSI})$+1 number of CSI-RSs (if $\max_{transmitting\ RS}(N_{ID}^{ECSI})$ is configured as a representative value, $N_{ID}^{ECSI}$ number of CSI-RSs) according to a CSI-RS configuration, which is RRC configured via an identical specific CSI-RS-ConfigNZPId-r11 value.

In this case, in relation to CSI (RI, PMI, CQI) reporting, the UE, which has transmitted CQI, RI, and PMI in response to a single CSI-RS, is unable to know a CSI-RS on which CSI measurement and CSI feedback to be performed among the $\max_{transmitting\ RS}(N_{ID}^{ECSI})$+1 number of CSI-RSs (or, if the $\max_{transmitting\ RS}(N_{ID}^{ECSI})$ is configured as a representative value, $N_{ID}^{ECSI}$ number of CSI-RSs in a set of $N_{ID}^{ECSI}$ to which a different $N_{ID}^{ECSI}$ value is applied.

Hence, the present invention proposes to make the UE feedback on a CSI using 1-A method and 1-B method described in the following related to CQI reporting in a CSI process configuration in response to the first method.

1-A method: CQI, PMI and RI information corresponding to all CSI-RSs transmitted in a single CSI-RS configuration are all fed back. In particular, the UE individually performs CSI measurement on all NZP CSI-RS configurations (each with different $N_{ID}^{ECSI}$), which are configured by a specific CSI-RS-ConfigNZPId-r11 value indicated by a CSI process configuration, according to each NZP CSI-RS (with different $N_{ID}^{ECSI}$), calculates corresponding CSI (RI/PMI/CQI), and performs CSI reporting by multiplexing all of the CSIs. Or, the UE can perform CSI reporting by multiplexing a part of the CSIs according to a specific multiplexing scheme. In this case, the UE can measure interference in a manner of commonly referring to an indicated csi-IM-ConfigId-r11.

1-B method: Index (or $N_{ID}^{ECSI}$) of a CSI-RS including a biggest value among CQIs corresponding to all CSI-RSs transmitted in a CSI-RS configuration and information on CQI, PMI and RI corresponding to the CSI-RS are fed back.

In particular, the UE individually performs CSI measurement on all NZP CSI-RS configurations (each with different $N_{ID}^{ECSI}$), which are configured by a specific CSI-RS-ConfigNZPId-r11 value indicated by a CSI process configuration, according to each NZP CSI-RS (with different $N_{ID}^{ECSI}$), calculates corresponding CSI (RI/PMI/CQI), selects best CSI (e.g., max CQI) among the CSIs and reports the index (or $N_{ID}^{ECSI}$) of the CSI-RS and the CSI. In this case, the UE can measure interference in a manner of commonly referring to an indicated csi-IM-ConfigId-r11.

Moreover, in case of configuring a CSI process, the 1-B method for reporting CQI can be applied when the first method proposed by the present invention is not used. For example, when a plurality of CSI process configurations are defined and a single CSI-RS is combined with each of a plurality of the CSI process configurations, the 1-B method can be used to make a feedback on an index (or $N_{ID}^{ECSI}$) of a CSI-RS corresponding to a CSI process configuration including a CQI of a maximum value and make a feedback on CQI, PMI and RI corresponding to the CSI-RS.

And, according to the present invention, as mentioned in the following description (third method), it may be able to designate a set of $N_{ID}^{ECSI}$ only in RS-configuration and may be able to designate a specific $N_{ID}^{ECSI}$ value in a CSI process configuration.

In particular, according to the third method of the present invention, i) it is able to designate a set of $N_{ID}^{ECSI}$ only in a CSI-RS configuration and it is able to designate a specific $N_{ID}^{ECSI}$ value in a CSI process configuration or ii) it is able to designate a specific $N_{ID}^{ECSI}$ value in a CSI process configuration only while a set of $N_{ID}^{ECSI}$ is not designated in a CSI-RS configuration. In particular, in case of i), among values designated to an RS-configuration value as a set of $N_{ID}^{ECSI}$, it may indicate that one reference signal using $N_{ID}^{ECSI}$, which is designated in a CSI process configuration, as an ERS ID is transmitted. And, in case of ii), it may indicate that a set of $N_{ID}^{ECSI}$ is not designated in an RS-configuration value and one reference signal using $N_{ID}^{ECSI}$, which is designated in a CSI process configuration, as an ERS ID is transmitted. In this case, the $N_{ID}^{ECSI}$ corresponds to an ERS ID of an initial ID for a reference signal scrambling sequence.

In the following, a CSI-RS-based RSRP according to the present invention is explained.

According to a legacy LTE communication system, RSRP (reference signal received power) corresponding to power of a signal received by a UE is measured via a CRS in general. Yet, in case of considering a vertical cell in a 3D MIMO technology to which a 2D-AAS is applied, it is highly probable that beams for each vertical cell are transmitted to a different direction.

In this case, a CRS beam for a legacy UE and a CRS beam to which the 2D-AAS is applied can be collided with each other. In order to solve the collision problem, a discussion on a method of measuring RSRP using a CSI-RS, which is configured for the 2D-AAS, is in progress. In the following, a fourth method and a fifth method are explained based on a case of using CSI-RS based RSRP.

In the fourth method of the present invention, assume a case that a base station asks a UE to make a report on RSRP or a case that the UE performs RSRP reporting according to a specific event. When the first method of the present invention is used under the aforementioned assumption, the UE measures RSRP on $\max_{transmitting\ RS}(N_{ID}^{ECSI})+1$ number of CSI-RSs configured by a specific CSI-RS-ConfigNZPId-r11 or measures RSRP on $N_{ID}^{ECSI}$ number of CSI-RSs in a set of $N_{ID}^{ECSI}$ (if $\max_{transmitting\ RS}(N_{ID}^{ECSI})$ is configured as a representative value) and makes a feedback on a value of $N_{ID}^{ECSI}$ including RSRP of a biggest value.

Moreover, according to the fourth method of the present invention, the base station configures a plurality of CSI-RS configurations (in this case, a plurality of CSI-RSs are set to each of a plurality of the CSI-RS configurations) and the base station can perform such an RSRP reporting scheme as 4-1 method to 4-4 method described in the following on a set of all CSI-RSs. In this case, when the base station asks the UE to make an RSRP report, the base station can signal the total number of RSRPs to be reported by the UE. Yet, after the signal is performed by the base station, the number of RSRPs reported in a set is unable to exceed the number of sets of the CSI-RSs.

4-A method: In order to report a CSI-RS including RSRP of a biggest value to the base station, the UE can make a feedback on a combination of an index of a CSI-RS configured for the 2D-AAS and a value of $N_{ID}^{ECSI}$.

4-B method: The UE can transmit all $N_{ID}^{ECSI}$ values of a CSI-RS including RSRP of a biggest value in each of CSI-RSs configured for the 2D-AAS.

4-C method: The base station signals the total number of RSRPs to be reported by the UE to the UE and the UE can transmit $N_{ID}^{ECSI}$ values of a CSI-RS as many as the numbers signaled in descending order from a biggest value on the basis of RSRP to the base station. In this case, it may be able to configure maximum one $N_{ID}^{ECSI}$ value to be selected from each CSI-RS configuration for the 4-C method.

4-A method: Among the aforementioned 4-A, the 4-B and the 4-C method, a method specified by higher layer signaling can be applied.

According to a fifth method of the present invention, when a base station asks a UE to report RSRP via high layer signaling, if the second method or the third method of the present invention is applied, the UE measures RSRP on a CSI-RS configured for a 2D-AAS and makes a feedback on a CSI-RS index (or $N_{ID}^{ECSI}$) including RSRP of a biggest value. In this case, the base station can indicate to discover a CSI-RS including the RSRP of the biggest value in a specific CSI-RS set. In this case, the base station can inform the UE of the specific CSI-RS set (e.g., CSI-RS indexes or $N_{ID}^{ECSI}$ values) via higher layer signaling.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

The memory unit is located at the interior or exterior of the processor and may transmit and receive data to and from the processor via various known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method of transmitting an enhance reference signal in a wireless communication system supporting multiple antennas and an apparatus therefor are described centering on examples applied to 3GPP LTE system, it may be applicable to various wireless communication systems as well as to the 3GPP LTE system.

What is claimed is:

1. A method of transmitting a reference signal by a base station in a wireless communication system supporting multiple antennas, the method comprising:
   transmitting a reference signal configuration including an only one reference signal identification (ID) representative of a specific initial ID set;
   transmitting at least one or more reference signals associated with a plurality of antenna groups; and
   receiving channel state information measured according to the at least one or more reference signals,
   wherein a plurality of reference signal IDs included in the specific initial ID set are determined by a user equipment using the only one reference signal ID,
   wherein the plurality of antenna groups are identified based on the plurality of reference signal IDs,
   wherein each of the plurality of antenna groups comprises a plurality of antennas which are configured based on a specific domain of the multiple antennas, and
   wherein each of the plurality of antenna groups is configured to have beamforming in a direction different to each other.

2. The method of claim 1, wherein the at least one or more reference signals are defined to be quasi co-located.

3. The method of claim 1, wherein the channel state information is configured to report channel state information measured for all channels associated with the at least one or more reference signals.

4. The method of claim 1, wherein the channel state information is a maximum value among at least one or more reference signal received powers (RSRPs), which are measured according to the at least one or more reference signals, and the specific reference signal ID.

5. The method of claim 1, wherein the channel state information is a reference signal ID associated with a maximum value among at least one or more reference signal received powers (RSRPs), which are measured according to the at least one or more reference signals.

6. The method of claim 1, wherein the channel state information is reference signal received powers (RSRPs) as many as the number of parameters signaled by the base station and a reference signal ID associated with the RSRPs.

7. A base station transmitting a reference signal in a wireless communication system supporting multiple antennas, the base station comprising:
   a radio frequency (RF) unit configured to transmit and receive a signal; and
   a processor connected with the RF unit,
   wherein the processor is configured to:
      transmit, through the RF unit, a reference signal configuration including an only one reference signal identification (ID) representative of a specific initial ID set,
      transmit, through the RF unit, at least one or more reference signals associated with a plurality of antenna groups, and
      receive, through the RF unit, channel state information measured according to the at least one or more reference signals,
      wherein a plurality of reference signal IDs included in the specific initial ID set are determined by a user equipment using the only one reference signal ID,
      wherein the plurality of antenna groups are identified based on the plurality of reference signal IDs,
      wherein each of the plurality of antenna groups comprises a plurality of antennas which are configured based on a specific domain of the multiple antennas, and
      wherein each of the plurality of antenna groups is configured to have beamforming in a direction different to each other.

* * * * *